United States Patent
Zang et al.

(10) Patent No.: US 7,209,975 B1
(45) Date of Patent: Apr. 24, 2007

(54) AREA BASED SUB-PATH PROTECTION FOR COMMUNICATION NETWORKS

(75) Inventors: Hui Zang, Burlingame, CA (US); Canhui Ou, Davis, CA (US)

(73) Assignee: Sprint Communications Company L.P., Overland Park, KS (US)

(*) Notice: Subject to any disclaimer, the term of this patent is extended or adjusted under 35 U.S.C. 154(b) by 773 days.

(21) Appl. No.: 10/099,079

(22) Filed: Mar. 15, 2002

(51) Int. Cl.
*G06F 15/173* (2006.01)

(52) U.S. Cl. .................. 709/238; 709/239; 709/241; 709/242; 370/401; 370/402; 370/404

(58) Field of Classification Search ........ 709/238–243, 709/220; 370/400–406, 216, 222, 225, 238, 370/241, 248, 252, 389; 398/5, 59
See application file for complete search history.

(56) References Cited

U.S. PATENT DOCUMENTS

| | | | |
|---|---|---|---|
| 6,115,753 A * | 9/2000 | Joens ........................ | 709/242 |
| 6,643,464 B1 * | 11/2003 | Roorda et al. ................ | 398/59 |
| 6,850,705 B2 * | 2/2005 | Su et al. ........................ | 398/5 |
| 2001/0032271 A1 * | 10/2001 | Allen ........................ | 709/239 |
| 2002/0150041 A1 * | 10/2002 | Reinshmidt et al. ........ | 370/216 |
| 2002/0167899 A1 * | 11/2002 | Thompson et al. ......... | 370/222 |
| 2002/0181393 A1 * | 12/2002 | Grover et al. .............. | 370/225 |
| 2002/0181402 A1 * | 12/2002 | Lemoff et al. .............. | 370/238 |
| 2002/0191545 A1 * | 12/2002 | Pieda et al. ................. | 370/238 |
| 2003/0037168 A1 * | 2/2003 | Brabson et al. ............. | 709/249 |
| 2003/0058798 A1 * | 3/2003 | Fleischer et al. ........... | 370/238 |
| 2003/0063613 A1 * | 4/2003 | Carpini et al. ............. | 370/401 |
| 2003/0161304 A1 * | 8/2003 | deBoer et al. .............. | 370/386 |
| 2003/0223359 A1 * | 12/2003 | Einstein et al. ............. | 370/228 |
| 2004/0179472 A1 * | 9/2004 | Khalilzadeh et al. ....... | 370/227 |
| 2004/0205239 A1 * | 10/2004 | Doshi et al. ................. | 709/241 |
| 2004/0246892 A1 * | 12/2004 | Elie-Dit-Cosaque et al. ........................... | 370/216 |
| 2005/0036442 A1 * | 2/2005 | Saleh et al. ................. | 370/216 |
| 2005/0071484 A1 * | 3/2005 | Kang et al. ................. | 709/230 |

FOREIGN PATENT DOCUMENTS

| | | |
|---|---|---|
| EP | 1 303 110 A2 * | 4/2003 |
| JP | 2002335276 A * | 11/2002 |

OTHER PUBLICATIONS

Hui Zang et al. "Path-Protection routing and Wavelength Assigment (RWA) in WDM Mesh Networks under Duct-Layer Constraints", Apr. 2003.*
Ramamurthy et al. "Survivable WDM Mesh Networks", Apr. 2003.*
Vishal Anand "A study of various protection schemes in optical WDM mesh networks", Dec. 2000.*

(Continued)

*Primary Examiner*—ThuHa Nguyen (57) ABSTRACT

Methods, software products, and systems establish a connection between a source network element and a destination network element in a communication network comprising a plurality of first network elements. The first network elements are partitioned into at least two areas wherein a shared network element is shared between the at least two areas. A working path is then generated between the source network element and the destination network element through the shared network element. A first backup sub-path is then generated within a first one of the at least two areas between the source network element and the shared network element. A second backup sub-path is generated within a second one of the at least two areas between the shared network element and the destination network element.

39 Claims, 7 Drawing Sheets

OTHER PUBLICATIONS

Callinescu et al. "Minimizing electronic line terminals for automatic ring protection in general WDM optical networks", Jan. 2002.*

Grover et al. "Design of a Meta-Mesh of chain subnetworks: Enhancing the attractiveness of Mesh-Restorable WDM Networking on low connectivity graphs", Jan. 2002.*

Visvanathan et al. "WDM mesh network link protection with wavelength conversion", Computer science and Engineering University of Nebraska-Lincoln.*

Krishnaswamy, Rajesh M.; Snarajan, Kumar N., "Design of Logical Topolgies: A Linear Formulation for Wavelength Routed Optical Networks with No Wavelength Changers.", Electrical Communication Engineering Department, Indian Insttiute of Science, IEEE, pp. 919-927.*

Mukherjee, Biswanath, "Optical Communication Networks," Department of Computer Science, University of California, Davis McGraw-Hill, 1997.

Zhu, Keyao and Mukherjee, Biswanath. "A Review of Traffic Grooming in WDM Optical Networks: Architectures and Challenges." Computer Science Department, University of California, Davis, Davis, CA 95616, pp. 1-17.

Modiano, Eytan; Lin, Philip J., "Traffic Grooming in WDM Networks," IEEE, Jul. 2001, pp. 124-129.

Zhu, Keyao and Mukherjee, Biswanath, "Traffic Grooming in an Optical WDM Mesh Network," IEEE, vol. 20, No. 1, Jan. 2002, pp. 122-133.

Chlamtac, Imrich, "Lightpath Communications: An Approach to High Bandwidth Optical WAN'" IEEE, vol. 40, No. 7, Jul. 1992, pp. 1171-1182.

Mukherjee, Biswanath, "Some Principles for Designing a Wide-Area WDM Optical Network," IEEE, vol. 4, No. 5, Oct. 1996, pp. 684-696.

Ramaswami, Rajiv, "Design of Logical Topologies for Wavelength-Routed Optical Networks," IEEE, vol. 14, No. 5, Jun. 1996.

Ganz, Aura; Wang, Xudong, "Efficient Algorithm for Virtual Topology Design In Multihop Lightwave Networks," IEEE, vol. 2, No. 3, Jun. 1994, pp. 217-225.

Krishnaswamy, Rajesh M.; Sivarajan, Kumar No., "Design of Logical Topologies: A Linear Formulation for Wavelength Routed Optical Networks with No Wavelength Changers," Electrical Communication Engineering Department, Indian Institute of Science, IEEE, pp. 919-927.

Gerstel, O.; Lin, P.; Sasaki, G., "Combined WDM and Sonet Network Design," IEEE 1999 pp. 734-743.

Zang, Hui, Jue, Jason P.; Mukherjee, Biswanath, "A Review of Routing and Wavelength Assignment Approaches for Wavelength-Routed Optical WDM Networks," Baltzer Science Publishers 2000, pp. 47-60.

Chlamtac, I., Ganz, A. and Karmi, G., "Lightnets: Topologies for High-Speed Optical Networks," IEEE vol. 11, No. 5/6, Many/Jun. 1993, pp. 951-961.

Chiu, Angela L. and Modiano, Eytan H., "Traffic Grooming Algorithms for Reducing Electronic Multiplexing Costs in WDM Ring Networks," IEEE, vol. 18, No. 1, Jan. 2000.

Wan, Peng-Jun; Calinescu, Gruia, Liu, Liwu, and Frieder, Ophir, "Grooming of Arbitrary Traffic in SONET/WDM BLSRs," IEEE, vol. 18, No. 10, Oct. 2000, pp. 1995-2003.

Zhang, Xijun and Qiao, Chunming, "An Effective and Comprehensive Approach for Traffic Grooming and Wavelength Assignment in SONET/WDM Rings," vol. 8, No. 5, Oct. 2000.

Gerstel, Ornan, Ramaswami, Rajiv, and Sasaki, Galen H., "Cost-Effective Traffic Grooming in WDM Rings," IEEE, vol. 8, No. 5, Oct. 2000, pp. 618-630.

Simmons, Jane M.; Goldstein, Evan L.; and Saleh, Adel A.M., "Quantifying the Benefit of Wavelength Add-Drop in WDM Rings with Distance-Independent and Department Traffic," IEEE, vol. 17, No. 1., Jan. 1999, pp. 48-57.

Dutta, Rudra and Rouskas, George N., "On Optimal Traffic Grooming in WDM Rings," IEEE, vol. 20, No. 1, Jan. 2002, pp. 110-121.

Wang, Jian; Cho, Wonhong; Vemuri, V. Rao; and Mukherjee, Biswanath, "Improved Approaches for Cost-Effective Traffic Grooming In WDM Ring Networks: ILP Formulations and Single-Hop and Multihop Connections," IEEE, vol. 19, No. 11, Nov. 2001.

Wang, Jian, Mukherjee, Biswanath, "Interconnected WDM ring Networks: Strategies for Interconnection and Traffic Grooming," SPIE Optical Networks Magazine.

Berry, Randall and Modiano, Eytan, "Reducing Electronic Multiplexing Costs in SONET/WDM rings with Dynamically Changing Traffic," IEEE, vol. 18, No. 10, Oct. 2000, pp. 1961-1971.

Konda, V. R; and Chow, T. Y., "Algorithm for Traffic Grooming in Oprical Networks To Minimize the Number of Transceivers," IEEE Workshop on High Performance Switching and Routing, (Dallas, TX), pp. 218-221, May 2001.

Brunato, Mauro and Battiti, Roberto, "A Multistart Randomized Greedy Algorithm for Traffic Grooming on Mesh Logical Topologies," Technical Report Universita di Trento, Dec. 2001.

Thiagarajan, Sashisekaran and Somani, Arun K., "Capacity fairness of WDM Networks with Grooming Capabilities,", Optical Networks Magazine, May/Jun. 2001, pp. 24-32.

Srinivasan, R.; and Somani, Arun K., "A Generalized Framework for Analyzing Time-Space Switched Optical Networks," IEEE, vol. 20, No. 1, Jan. 2002, pp. 202-215.

Zhu, Keyao and Mukherjee, Biswanath, "On-Line Approaches for Provisioning Connections of Different Bandwidth granularties in WDM Mesh Networks," OFC/ 2001.

Cox, JR., Louis Anthony and Sanchez (Ryan) Jennifer, Cost Savings from Optimized packing and grooming of Optical circuits: Mesh Versus ring Comparisons, optical Networks Magazine, May/Jun. 2001, pp. 72-90.

Lardies, Ana, Gupta, Rakesh and Patterson, Raymond A., "Traffic Grooming in a Multi-Layer Network," Optical Networks Magazine, May/Jun. 2001, pp. 91-99.

Subramaniam, Suresh, Azizoglu, Murat and Somani, Arun K., "All-Optical Networks with Sparse Wavelength Conversion," IEEE, vol. 4, No. 4, Aug. 1996, pp. 544-557.

Iness, Jason; and Mukherjee, Biswanath, "Sparse Wavelength Conversion in Wavelength-Routed WDM Optical Networks," Photonic Network Communications, 1:3, 183-205 (1999).

Yates, Jennifer, Lacey, Jonathan, Everitt, David and Summerfield, Mark, "Limited-Range Wavelength Translation In all-Optical Networks," IEEE 1996, pp. 954-961.

Ramaswami, Rajiv and Sasaki, Galen, "Multiwavelength Optical Networks with Limited Wavelength Conversion," IEEE, vol. 6, No. 6, Dec. 1998, pp. 744-754.

Venugopal, K. R; Shivakumar, M. and Kumar, P. Sreenivasa, "A Heuristic for Placement of Limited Range Wavelength Converters in All-Optical Networks," IEEE INFOCOM '99, vol. 2, (New York, NY), pp. 908-915, Mar. 1999.

Tripathi, Tushar and Sivarajan, Kumar N., "Computing Approximate Blocking Probabilities in Wavelength Routed All-Optical Networks with Limited-Range Wavelength Conversion," IEEE, vol. 18, No. 10, Oct. 2000, pp. 2123-2129.

Mukherjee, Biswanath, "WDM Optical Communication Networks: Progress and Challenges," IEEE, vol. 18, No. 10, Oct. 2000, pp. 1810-1824.

Ellinas, Georgios, Hailemariam, Gebreyesus and Stern, Thomas E., "Protection Cycles in Mesh WDM Networks," IEEE vol. 18, No. 10, Oct. 2000, pp. 1924-1937.

Ho, Pin-Han and Mouftah, H. T, "SLSP: A new path protection scheme for the optical Internet" Proc. OFC 2001, Tu01, 2001.

Gerstel, Ornan (ORI) and Ramasawami, Rajiv, "Optical Layer Survivability—An Implementation Perspective," IEEE, vol. 18, No. 10, Oct. 2000, pp. 1885-1899.

Ramamurthy, S. and Mukherjee, Biswanath, Survivable WDM Mesh Networks, Part I- Protection and Part II—Restoration, IEEE INFO-COM 1999, vol. 2, pp. 744-751, Mar. 1999, Part II in Proc. ICC 1999, vol. 3, pp. 2023-2030, Jun. 1999.

Thiagarajan, Sashisekaran and Somani, Arun K., "Traffic Grooming for Survivable WDM Mesh Networks," Dependable Computing & Networking Laboratory, Department of Electrical and Computer Engineering, Iowa State university, Ames, IA 50011.

* cited by examiner

AREA BASED SUB-PATH PROTECTION FOR COMMUNICATION NETWORKS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of telecommunications, and in particular, to an area based sub-path protection for communication networks.

2. Description of the Prior Art

Communication networks include network elements that are connected to each other through communication links. Some examples of network elements are transceivers, switches, routers, and cross-connect devices. Some of these network elements use optical technology to exchange communications over optical fiber links. One such technology is wavelength division multiplexing (WDM), where each wavelength of an optical signal carries a different channel of communications. Thus, an optical fiber link carries a number of channels of communications using WDM.

These optical transmission channels between two network elements are called lightpaths. A lightpath may travel through multiple fiber links. Some lightpaths operate at the rate of a few gigabits per second (Gbps). In some communication networks without wavelength converters, a lightpath occupies the same wavelength on all the fiber links it traverses, which is referred to as wavelength continuity. When using lightpaths, the routing of the lightpaths and the wavelength assignment of lightpaths are determined.

In one example of the communication networks, the network elements within the communication network are connected in a ring configuration. Each network element is connected to two other network elements to form a ring. Some rings are connected to other rings, where shared network elements are stacked to interconnect rings. These ring configurations have poor scalability and use excessive resource redundancy for failure recovery. Thus, network configurations are migrating from ring network to mesh networks, where network elements are connected to two or more network elements. In another example, a communication network using Internet Protocol (IP) is partitioned into regional areas for control and management purposes.

Network element or optical fiber link failure in a communication network results in loss of data or delays in data, which both result in revenue loss. There are two types of fault management to handle the failure of the network element or optical fiber link: protection and restoration. Restoration is a reactive procedure in which spare capacity is available after the fault's occurrence is utilized for rerouting the disrupted connections. Protection is a proactive procedure in which spare capacity is reserved as a backup resource during connection setup. A working path of a connection is setup, which is the path carrying the connection under normal operations. When a failure occurs on the working path of a connection, a portion of or the entire connection is switched to the pre-reserved backup resource.

Protection schemes are classified by type of rerouting and type of resource sharing. In a link-based rerouting, the connections are rerouted around the end network elements of the failed link. In a path-based rerouting, a backup path is selected between the end nodes of the working path. In a dedicated resource protection, the network resources such as wavelengths are not shared among backup paths. In a shared resource protection, the backup paths do share resources such as wavelengths, which utilizes network resources more efficiently. In shared-path protection, the backup paths can share resources as long as the corresponding primary paths are not in the same shared risk group (SRG). Two primary paths are in the same SRG if they traverse the same fiber, or the fibers they traverse are in the same cable or in the same duct.

Some prior solutions for mesh WDM communication networks use protection schemes that protect the communication network as a whole. Some of these prior solutions use integer linear programs (ILP) or simulated annealing based heuristics to solve routing and planning of capacity. These ILPs and heuristics minimize the total cost of a given static traffic demand set. However, as the communication networks increase in size, there are problems with long protection switching time and poor scalability.

Other prior solutions decompose a mesh communication network into different structures such as rings, protection cycles, p-cycles, and trees. Some of these prior solutions then perform automatic protection switching based on these individual structures. However, these prior solutions suffer from excessive resource redundancy.

SUMMARY OF THE INVENTION

The inventions solve the above problems by establishing a connection between a source network element and a destination network element via a working path and a backup path in a communication network comprising a plurality of first network elements. The first network elements are partitioned into at least two areas wherein a shared network element is shared between the at least two areas. A working path is then generated between the source network element and the destination network element through the shared network element. A first backup sub-path is then generated within a first one of the at least two areas between the source network element and the shared network element. A second backup sub-path is generated within a second one of the at least two areas between the shared network element and the destination network element.

In some embodiments, the communication network comprises a mesh configuration wherein each of the first network elements is connected to at least two other first network elements. In some embodiments, the first network elements are partitioned into the at least two areas using border gateway protocols (BGP). In other embodiments, the first network elements are partitioned into the at least two areas by administrative domains. In some embodiments, values are assigned to links between the first network elements and the generation of the working path, the first backup sub-path, and the second backup sub-path is based on the values.

In some embodiments, a failure of a link or one of the first network elements is detected in one of the at least two areas and the communication traffic is switched on a portion of the working path to a respective backup sub-path in the one of the at least two areas where the failure was detected. In one embodiment, wavelengths are assigned to the working path, the first backup sub-path, and the second backup sub-path.

BRIEF DESCRIPTION OF THE DRAWINGS

The same reference number represents the same element on all drawings.

DETAILED DESCRIPTION OF THE PREFERRED EMBODIMENT

FIGS. 1–7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
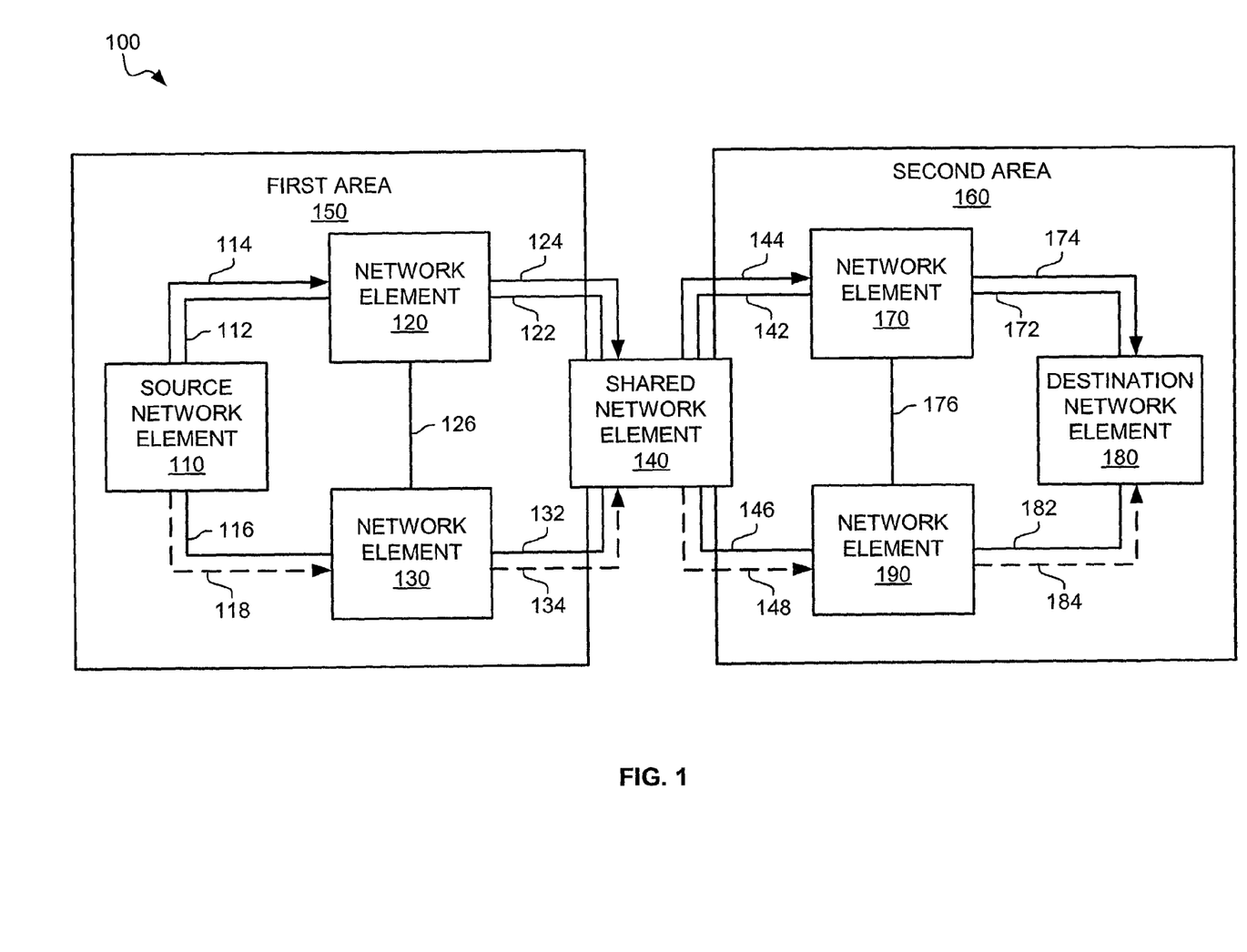
FIG. 1 is a block diagram of a communication network in an example of the invention.
Figure 2:
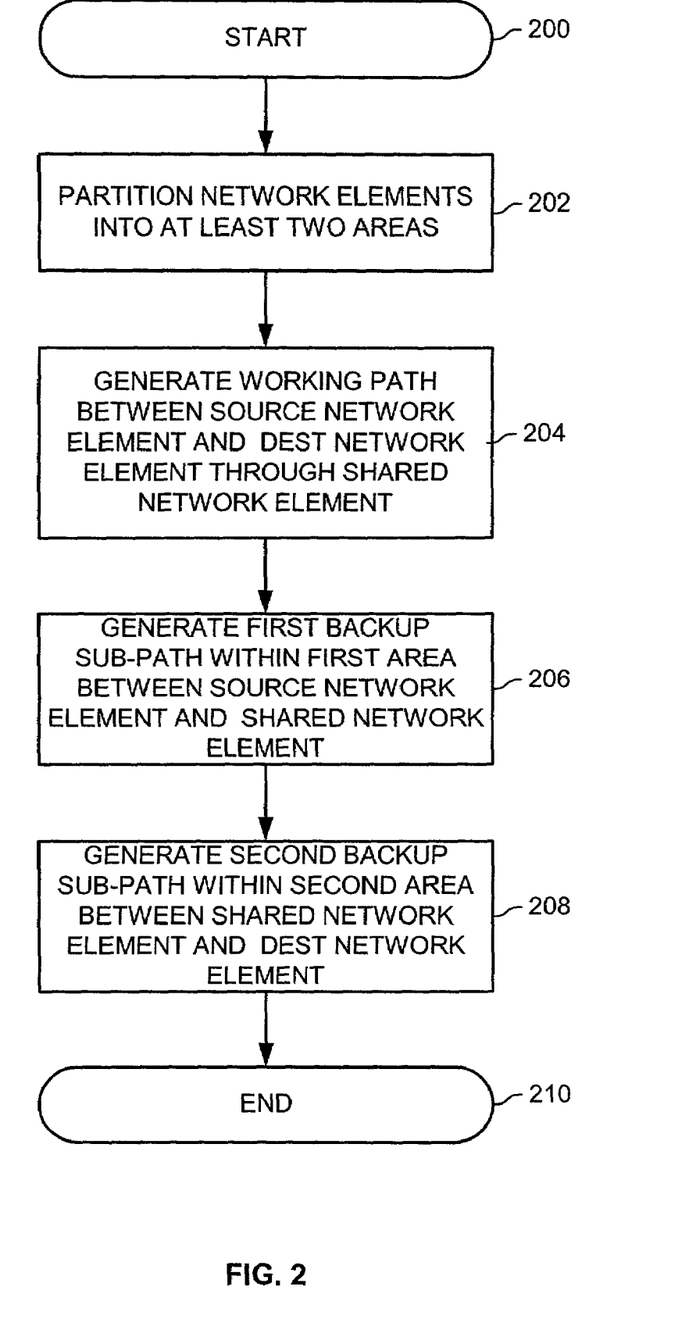
FIG. 2 is a flow chart of the communication network in an example of the invention.

Establishing Connections with Sub-Path Protection in a Communication Network—FIGS. 1–2

FIG. 1 depicts a block diagram of a communication network 100 in an example of the invention. The communication network 100 includes a source network element 110, a network element 120, a network element 130, a shared network element 140, a network element 170, a destination network element 180, and a network element 190. A first area 150 includes the source network element 110, the network element 120, the network element 130, and the shared network element 140. A second area 160 includes the shared network element 140, the network element 170, the destination network element 180, and the network element 190.

The source network element 110 is connected to the network element 120 and the network element 130 via a link 112 and a link 116 respectively. The network element 120 is connected to the network element 130 and the shared network element 140 via a link 126 and a link 122 respectively. The network element 130 is connected to the shared network element 140 via a link 132. The shared network element 140 is connected to the network element 170 and the network element 190 via a link 142 and a link 146 respectively. The network element 170 is connected to the network element 190 and the destination network element 180 via a link 176 and a link 172 respectively. The network element 190 is connected to a destination network element 180 via a link 182.

Figure 3:
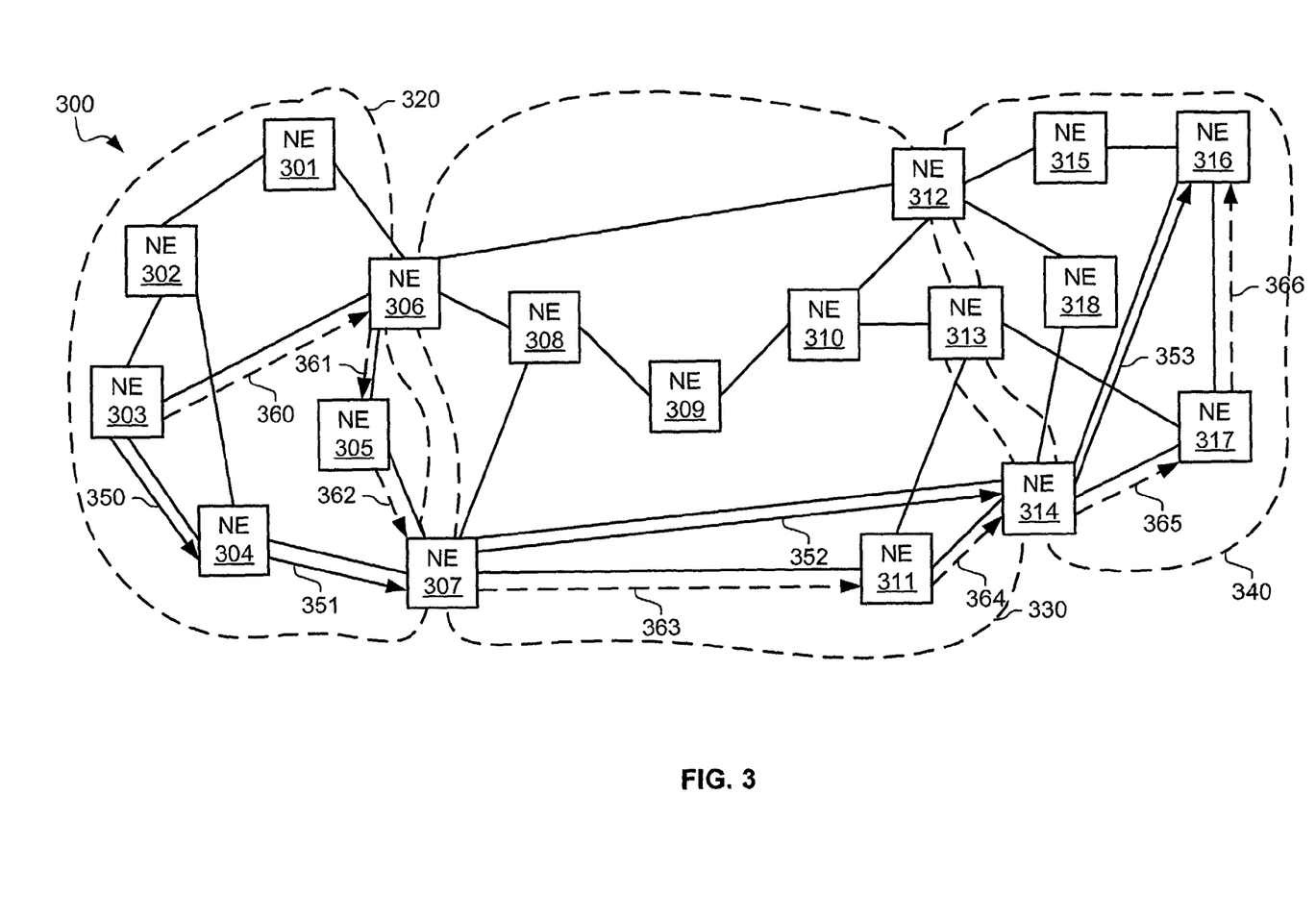
FIG. 3 is an illustration of a mesh communication network in an example of the invention.

A connection from the network element 110 to the network element 180 is established in the communication network 100. The connection consists of two paths: a working path and a backup path, which consists of two sub-paths. A working path includes a channel 114, the network element 120, a channel 124, the network element 140, a channel 144, the network element 170, and a channel 174. The first backup sub-path includes a channel 118, the network element 130, and a channel 134. The second backup sub-path includes a channel 148, the network element 190, and a channel 184. In some embodiments, the channels depicted in FIGS. 1 and 3 are included within the respective links. For example, a channel such as a lightpath that carries information over one optical wavelength is included with other lightpaths in a link such as an optical fiber link.

A network element is any device or group of devices configured to exchange data over communication links. Some examples of network elements are switches, routers, and cross-connect devices. A source network element 110 is any network element that is an origination for a connection. A destination network element 180 is any network element that is a destination for a connection. A link is any physical connection, wire, or fiber that carries data. One example of a link is an optical fiber link. An area is any delineation, arrangement, or classification that groups network elements together. Some areas may be regional or based on ownership or management of network devices. A working path is any path, channel, or connection that carries communication traffic during normal operations. A backup path is any path, channel, or connection that carries communication traffic after the communication traffic is switched from a working path due to failure of a link or a network element. A backup sub-path is any segment or portion of the backup path. A failure is any malfunction, problem, or condition in which a network element or a link is not performing optimally. A shared network element 140 is any network element that is included within two or more areas.

FIG. 2 depicts a flow chart of the communication network in an example of the invention. FIG. 2 begins in step 200. In step 202, the network elements are partitioned into at least two areas. Partitioning is the process of separating, arranging, or classifying network elements into areas. In the example of FIG. 1, the source network element 110, the network element 120, the network element 130, and the shared network element 140 are partitioned into the first area 150. Also, in FIG. 1, the shared network element 140, the network element 170, the destination network element 180, and the network element 190 are partitioned into the second area 160.

In step 204, the working path is generated between the source network element 110 and the destination network element 180 through the shared network element 140. In the example of FIG. 1, the working path includes the channel 114, the network element 120, the channel 124, the network element 140, the channel 144, the network element 170, and the channel 174. Thus, communications can occur over the working path between the source network element 110 and the destination network element 180.

In step 206, the first backup sub-path is generated within the first area 150 between the source network element 110 and the shared network element 140. In the example of FIG. 1, the first backup sub-path includes the channel 118, the network element 130, and the channel 134. In step 208, the second backup sub-path is generated within the second area 160 between the shared network element 140 and the destination network element 180. In the example of FIG. 1, the second backup sub-path includes the channel 148, the network element 190, and the channel 184. In some embodiments, this process of the generation of the first backup sub-path and the second backup sub-path is called sub-path protection. FIG. 2 ends in step 210.

Connection Establishment and Failure Recovery in a Mesh Communication Network—FIGS. 3–6

FIG. 3 depicts an illustration of a mesh communication network 300 in an example of the invention. The mesh communication network 300 includes a network element (NE) 301, a NE 302, a NE 303, a NE 304, a NE 305, a NE 306, a NE 307, a NE 308, a NE 309, a NE 310, a NE 311, a NE 312, a NE 313, a NE 314, a NE 315, a NE 316, a NE 317, and a NE 318. A first area 320 includes the NE 301, the NE 302, the NE 303, the NE 304, the NE 305, the NE 306, and the NE 307. A second area 330 includes the NE 306, the NE 307, the NE 308, the NE 309, the NE 310, the NE 311, the NE 312, the NE 313, the NE 314. The third area 340 includes the NE 312, the NE 313, the NE 314, the NE 315, the NE 316, the NE 317, and the NE 318.

The NE 301 is connected to the NE 302 and the NE 306. The NE 302 is connected to the NE 303 and the NE 304. The NE 303 is connected to the NE 306 and the NE 304. The NE 304 is connected to the NE 307. The NE 305 is connected to the NE 306 and the NE 307. The NE 306 is connected to the NE 312 and the NE 308. The NE 307 is connected to the NE 308, the NE 314, and the NE 311. The NE 308 is connected to the NE 309. The NE 309 is connected to the NE 310. The NE 310 is connected to the NE 312 and the NE 313. The NE 311 is connected to the NE 313 and the NE 314. The NE 312 is connected to the NE 315 and the NE 318. The NE 313 is connected to the NE 317. The NE 314 is connected to the NE 318 and the NE 317. The NE 315 is connected to the NE 316. The NE 316 is connected to the NE 317.

In this example, a working path between the NE 303 and the NE 316 includes a wavelength 350, the NE 304, a wavelength 351, the NE 307, a wavelength 352, the NE 314, and a wavelength 353. The working path consists of three sub-paths. A first working sub-path includes the wavelength 350, the NE 304, and the wavelength 351. A second working sub-path includes the wavelength 352. A third working sub-path includes the wavelength 353. The backup path also consists of three sub-paths. A first backup sub-path includes a wavelength 360, the NE 306, a wavelength 361, the NE 305, and a wavelength 362. A second backup sub-path includes a wavelength 363, the NE 311, and a wavelength 364. A third backup sub-path includes a wavelength 365, the NE 317, and a wavelength 366.

In this embodiment depicted in FIG. 3, the mesh communication network 300 is in a mesh configuration where network elements can be connected to two or more other network elements. The mesh communication network 300 uses wavelength division multiplexing (WDM) and routes wavelengths of optical signals. The links between the network elements are optical fiber links. The links carry a number of lightpaths on different wavelengths. A lightpath is an all-optical transmission channel between two network elements. In some embodiments, a lightpath is carried over a single wavelength. In this embodiment, the network elements are optical devices such as optical cross-connects.

Figure 4:
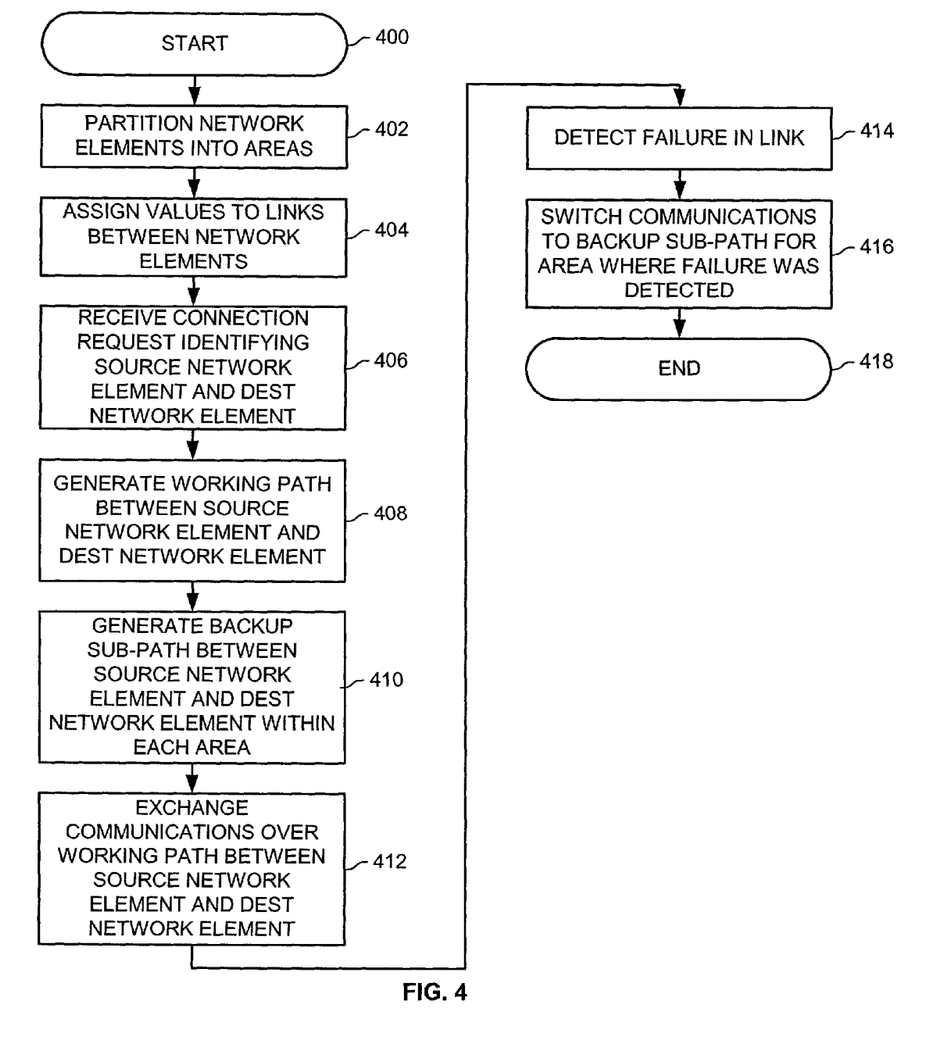
FIG. 4 is a flow chart for the mesh communication network in an example of the invention.

FIG. 4 depicts a flow chart for the mesh communication network 300 in an example of the invention. FIG. 4 begins in step 400. In step 402, the network elements in the mesh communication network 300 are partitioned into areas. In some embodiments, the partitioning into areas is done by a border gateway protocols (BGP) and using overlapping autonomous systems (AS), open shortest path first (OSPF) areas, or administrative domains. There are numerous variations of partitioning the network elements in a communication network such as regionally or by ownership that are not discussed for the sake of brevity and clarity. The example in FIG. 3 has three areas 320, 330, and 340 with the NE 306, the NE 307, the NE 312, the NE 313, and the NE 314 as shared network elements. In step 404, values are assigned to the links between the network elements in the mesh communication network 300. The value is any number, amount, or cost associated with a link between network elements. In some embodiments, the value is a mileage of the link. Thus, the determination of a working path or a backup path minimizes the total mileage the optical signal must propagate, which minimizes the average network delay. In other embodiments, the value of all links is a constant such as "1". Therefore, the determination of a working path or a backup path is based on the minimum number of links.

In step 406, a connection request is received that identifies a source network element and a destination network element. A connection request is any message, signaling, or instruction that indicates a request for a connection between a source network element and a destination network element. In the example in FIG. 3, the NE 303 is the source network element, and the NE 316 is the destination network element. In step 408, a working path is generated between the source network element and the destination network element based on the connection request and the values of the links. The working path between the NE 303 and the NE 316 includes a wavelength 350, the NE 304, a wavelength 351, the NE 307, a wavelength 352, the NE 314, and a wavelength 353. In other embodiments, there are numerous variations in determining a working path between a source network element and a destination network element that are not discussed for the sake of brevity and clarity.

In step 408, a backup path is generated between the source network element and the destination network element. In the example in FIG. 3, a first backup sub-path in the first area 320 between the NE 303 and the NE 307 is generated that includes the wavelength 360, the NE 306, the wavelength 361, the NE 305, and a wavelength 362. A second backup sub-path in the second area 330 between the NE 307 and the NE 314 is generated that includes the wavelength 363, the NE 311, and the wavelength 364. A third backup sub-path in the third area 340 between the NE 314 and the NE 316 is generated that includes the wavelength 365, the NE 317, and the wavelength 366.

In this embodiment, the determination of the backup path has some constraints. One constraint is the working path and the backup path are link-disjoint where the two paths do not share a common link such as an optical fiber link. Therefore, more specifically, the working path and the backup path also do not share the same wavelength on a common link. Another constraint is the backup path within each area only uses the network elements within the area. Also, another constraint is the backup path uses the same shared network element that the working path used to enter or exit the area. For example, the working path entered the second area 330 through the NE 307 and exited through the NE 314. The second backup sub-path for the second area 330 then had to enter through the NE 307 and exit through the NE 314. In this embodiment, the determination of the backup path is based on shared path protection within each area, where wavelengths are shared among multiple backup paths. In other embodiments, the determination of the backup path is based on dedicated path protection where no wavelengths are shared between backup paths. Also, in some embodiments, the determination of the backup path employs different path protection in different area to provide differentiated quality of service based protection for connection requests with different availability requirements.

In step 412, communications are exchanged over the working path between the source network element and the destination network element. In step 414, a failure in a link of the working path is detected. In this example, the link between the NE 307 and the NE 314 failed. In step 416, the communications from the working sub-path for the failed link is switched to the backup sub-path within the area where the failure was detected. In this example, the NE 307 switches the communications from the second working sub-path that contains the failed link between the NE 307 and the NE 314 to the second backup sub-path in the second area 330 where the failure occurred. Advantageously, only the segment of the backup path is used when the failure occurs in the respective area, and the other segments of the working path in the other areas are not affected. FIG. 4 ends in step 418.

Establishing a Set of Connections

The embodiment above is for a connection request to setup one connection. In other embodiments, there are a set of connection requests. There are three methods to establish a set of connections.

Integer Linear Program (ILP1)

In this embodiment, the determination of the working paths and the backup paths of a set of connections is done by an integer linear program (ILP). This embodiment that uses ILP will be called ILP1. ILP1 determines the routing and wavelength for each working path and backup sub-path, under the sub-path protection and SRG constraints. In this embodiment, the total number of resources used is minimized as shown by the following equation:

$$\text{Minimize} \sum_{w=1}^{W} \sum_{ij \in L} \left( m_{ij}^{w} + \sum_{1 \le k \le D} F_{ij}^{k,w} \right) \times C_{ij} \quad (1)$$

where W is a number of wavelengths available on each link;

w is an index of each wavelength;

ij is a link between network element i and network element j;

L is a set of unidirectional links in the communication network;

$m^{w}_{ij}$ is the value of "1" if some backup path utilizes wavelength w on link ij; the value of "0" otherwise;

k is an index of each connection in a set of connections;

D is the set of connection requests;

$F^{k,w}_{ij}$ is the value of "1" if the working path for connection k utilizes wavelength w on link ij; the value of "0" otherwise; and $C_{ij}$ is the cost associated with link ij.

The following two equations ensure that flow conserves at the source network element and the destination network element of a connection:

$$\sum_{w=1}^{W} \sum_{\forall j: sj \in L} F_{sj}^{k,w} - \sum_{w=1}^{W} \sum_{\forall j: js \in L} F_{js}^{k,w} = 1 \forall k, s = k_s \quad (2)$$

where $k_s$ is the source network element.

$$\sum_{w=1}^{W} \sum_{\forall j: jd \in L} F_{jd}^{k,w} - \sum_{w=1}^{W} \sum_{\forall j: dj \in L} F_{dj}^{k,w} = 1 \forall k, d = k_d \quad (3)$$

where $k_d$ is the destination network element.

The following two equations ensure that flow conserves on the intermediate network elements:

$$\sum_{\forall j: ij \in L} F_{ij}^{k,w} - \sum_{\forall e: je \in L} F_{je}^{k,w} = 0 \quad \forall k, w, \forall j \ne k_s, k_d \wedge j \notin R \quad (4)$$

where R is the set of shared network elements.

$$\sum_{w=1}^{W} \sum_{\forall j: ij \in L} F_{ij}^{k,w} - \sum_{w=1}^{W} \sum_{\forall e: je \in L} F_{je}^{k,w} = 0 \quad \forall 1 \le k \le D \forall j \ne k_s, k_d \wedge j \in R \quad (5)$$

In this embodiment, the flow conserves on a per-wavelength basis for non-shared network elements, while the sum of flow conserves on all wavelengths for shared network elements because the shared network elements are assumed to be wavelength convertible, while the non-shared network elements are assumed to be wavelength continuous.

The following four equations are the multicommodity flow equations that account for the routing of the backup path for a connection when a link fails:

$$\sum_{w=1}^{W} \sum_{\forall e: se \in L} \delta_{se,ij}^{k,w} - \sum_{w=1}^{W} \sum_{\forall e: es \in L} \delta_{es,ij}^{k,w} = \sum_{w=1}^{W} F_{ij}^{k,w} \quad \forall k, s = k_s, \forall ij \in L \quad (6)$$

where $\delta^{k,w}_{pq,ij}$ is the value of "1" if the backup path for connection k utilizes wavelength w on link pq when link ij fails; the value of "0" otherwise.

$$\sum_{w=1}^{W} \sum_{\forall p: pd \in L} \delta_{pd,ij}^{k,w} - \sum_{w=1}^{W} \sum_{\forall p: dp \in L} \delta_{pd,ij}^{k,w} = \sum_{w=1}^{W} F_{ij}^{k,w} \quad \forall k, d = k_d, \forall ij \in L \quad (7)$$

$$\sum_{\forall p: pq \in L} \delta_{pq,ij}^{k,w} - \sum_{\forall e: qe \in L} \delta_{qe,ij}^{k,w} \quad \forall k, w, \forall q \ne k_s, k_d \wedge q \notin R, \forall ij \in L \quad (8)$$

$$\sum_{w=1}^{W} \sum_{\forall p: pq \in L} \delta_{pq,ij}^{k,w} - \sum_{w=1}^{W} \sum_{\forall e: qe \in L} \delta_{qe,ij}^{k,w} = \quad (9)$$

$$0 \; \forall k, \forall q \ne k_s, k_d \wedge q \in R, \forall ij \in L$$

The $\delta^{k,w}_{pq,ij}$ is related to the $S^{k,w}_{ij}$, which is the value of "1" if the backup path for connection k utilizes wavelength w on link pq otherwise the value is "0".

The following set of equations ensures that the working path and the backup path are fiber-disjoint, in which the working path and the backup path do not share the same optical fiber link:

$$\delta_{ij,ij}^{k,w} = 0 \delta_{ij,ij}^{k,w} = 0 \forall k, w, \forall ij \in L \quad (10)$$

The following equations are a set of inequalities that realize the shared risk group constraints such that two working paths cannot traverse any common fiber if their corresponding backup path share the same wavelength on a common link:

$$\sum_{1 \leq k \leq D} \left( \delta_{pq,ij}^{k,w} + \delta_{pq,ji}^{k,w} \right) \leq 1 \quad \forall w, \forall A \in, \forall pq \neq ij \in L \wedge p, q, i, j \in A \quad (11)$$

where $A$ is the set of areas in the network where each area is a set of network elements.

The following three sets of equations ensure that no working path and backup path share the same wavelength w on a link. In particular, the following two equations decide whether a wavelength on a link is used by any backup path:

$$m_{pq}^w \leq \sum_{1 \leq k \leq D} \sum_{\forall ij \in L} \delta_{pq,ij}^{k,w} \quad \forall w, \forall pq \in L \quad (12)$$

$$D \times E \times m_{p,q}^w \geq \sum_{1 \leq k \leq D} \sum_{\forall ij \in L} \delta_{pq,ij}^{k,w} \forall w, \forall pq \in L \quad (13)$$

where E is the number of links in the network.

The following equations ensure that there is no sharing between work paths and backup paths:

$$m_{ij}^w + \sum_{1 \leq k \leq D} F_{ij}^{k,w} \leq 1 \quad \forall w, \forall ij \in L \quad (14)$$

The following two sets of equations derive the backup path for the working path for each connection request:

$$S_{pq}^{k,w} \leq \sum_{\forall ij \in L} \delta_{pq,ij}^{k,w} \quad \forall k, w, \forall pq \in L \quad (15)$$

$$E * S_{pq}^{k,w} \geq \sum_{\forall ij \in L} \delta_{pq,ij}^{k,w} \quad \forall k, w, \forall pq \in L \quad (16)$$

The following two sets of equations are area-related constraints, which when combined with equation (11) ensure that areas are autonomous. The following set of equation applies to intra-area connection request, and these intra-area connection requests should not use resources of other areas:

$$F_{ij}^{k,w} = 0 S_{ij}^{k,w} = 0 \forall w, \forall k \wedge (\exists A \in A \text{ s.t. } k_s, k_d \in A),$$
$$\forall i \in A \forall j \in A \quad (17)$$

If the predicate of $(\forall k \wedge (\exists A \in A \text{ s.t. } k_s, k_d \in A))$ is true, then the source network element, $k_s$, and the destination network element, $k_d$, belong to the same network area A. If the source network element and the destination network element are shared network elements, then the source network element and the destination network element could be in multiple areas. If so, a random area that include the source network element and the destination network element is picked.

The following set of equations applies to inter-area connections and ensures that working paths and backup paths of an inter-area connection enter or exit an area through a common shared network element:

$$\sum_{w=1}^{W} \sum_{\forall i \in A: ij \in L} F_{ij}^{k,w} - \sum_{w=1}^{W} \sum_{\forall e \in A: je \in L} F_{je}^{k,w} = \sum_{w=1}^{W} \sum_{\forall i \in A: ij \in L} S_{ij}^{k,w} - \sum_{w=1}^{W} \sum_{\forall e \in A: je \in L} S_{je}^{k,w} \quad (18)$$

$$(\forall A' \in A, \forall k \wedge \neg(k_s, k_d \in A')), \forall A \in A, \forall j \in R \wedge j \in A$$

The following equations state that all the variables are binaries:

$$F_{ij}^{k,w}, S_{ij}^{k,w}, m_{ij}^w, \delta_{pq,ij}^{k,w} \in \{0,1\} \forall k, w, \forall ij, pq \in L \quad (19)$$

In another embodiment, the ILP accounts for arc-disjoint working paths and backup paths instead of link-disjoint working paths and backup paths. Arc-disjointedness refers to that working paths and backup paths that do not traverse links in the same direction. The following equations employ arc-disjoint working paths and backup paths, which is shown as follows:

$$\delta_{ij,ij}^{k,w} = 0 \forall k, w \forall ij \in L \quad (20)$$

$$\sum_{1 \leq k \leq D} \delta_{pq,ij}^{k,w} \leq 1 \quad \forall w, \forall A \in, \forall pq \neq ij \in L \wedge p, q, i, j, \in A \quad (21)$$

ILP2

In another embodiment of ILP called ILP2, there are essentially two ILPs. First, a routing ILP determines the routing of the working path and the backup path for each connection based on sub-path protection constraints and the maximization of wavelength sharing among backup paths. Secondly, a wavelength assignment ILP assigns wavelengths to the working path and the backup path for each connection.

The routing ILP is composed of equations 22 through 32. The equation below specifies that the objective of route computation is to minimize the total capacity required:

$$\text{Minimize} \sum_{ij \in L} W_{ij} \quad (22)$$

where $W_{ij}$ is the total number of wavelengths required on link ij.

The following equation ensures that flow conserves at each network element for working paths:

$$\sum_j F_{ij}^k - \sum_j F_{ji}^k = \begin{cases} 1 & \text{if } i = k_s \\ -1 & \text{if } i = k_d \\ 0 & \text{otherwise} \end{cases} \quad \forall 1 \leq k \leq D, 1 \leq i \leq N \quad (23)$$

where $F_{ij}^k$ is the value of "1" if the working path for connection k utilizes link ij; the value of "0" otherwise.

The following equation states that flow conserves at each network element for backup paths:

$$\sum_q \delta_{pq}^{k,ij} - \sum_q \delta_{pq}^{k,ij} = \begin{cases} F_{ij}^k & \text{if } p = k_s \\ -F_{ij}^k & \text{if } p = k_d \\ 0 & \text{otherwise} \end{cases} \quad \forall 1 \le k \le D, 1 \le p \le N \quad (24)$$

where $\delta_{pq}^{k,ij}$ is the value of "1" if the connection k utilizes link ij along its working path and link pq along is backup path.

The following two sets of equations derive $S_{pq}^k$ from $\delta_{pq}^{k,ij}$:

$$S_{pq}^k \le \sum_{ij \in L \wedge i, j \in A} \delta_{pq}^{k,ij} \quad \forall k, A \in, pq \in L \wedge p, q \in A \quad (25)$$

$$E \times S_{pq}^k \ge \sum_{ij \in L \wedge i, j \in A} \delta_{pq}^{k,ij} \quad \forall k, A \in, pq \in L \wedge p, q \in A \quad (26)$$

where $S_{pq}^k$ is the value of "1" if the backup path for connection k utilizes link pq; the value of "0" otherwise.

The following set of equations ensures that working paths and backup paths for one connection are fiber-disjoint:

$$\delta_{ij}^{k,ij} = 0, \delta_{ji}^{k,ij} = 0 \forall k, \forall ij, ji \in L \quad (27)$$

The following two sets of equations state the capacity requirements on each link:

$$\sum_k (F_{ij}^k + \delta_{ij}^{k,pq}) \le W_{ij} \quad \forall A \in, ij \in L \wedge i, j \in A, pq \in L \wedge p, q \in A \quad (28)$$

$$W_{ij} \le W \forall ij \in L \quad (29)$$

The following two sets of equations are area related:

$$F_{ij}^k = 0 S_{ij}^k = 0 \forall k \wedge (\exists A \in A \text{ s.t. } k_s, k_d \in A) \forall i \in A \vee j \in A \quad (30)$$

$$\sum_{\forall i \in A: ij \in L} F_{ij}^k - \sum_{\forall e \in A: je \in L} F_{je}^k = \sum_{\forall i \in A: ij \in L} S_{ij}^k - \sum_{\forall e \in A: je \in L} S_{je}^k \quad (31)$$

$(\forall A' \in A, \forall k \wedge \neg (k_s, k_d \in A')), \forall A \in, \forall j \in R \wedge j \in A$ The following set of equations states that $F_{ij}^k$, $S_{pq}^k$, and $\delta_{pq}^{k,ij}$ are binaries while $W_{ij}$ is an integer:

$$F_{ij}^k, S_{pq}^k, \delta_{pq}^{k,ij} \in \{0,1\}, W_{ij} \in \text{integer} \forall 1 \le k \le D, ij, pq \in L \quad (32)$$

The wavelength assignment ILP is composed of equations 33 through 42. The wavelengths to the working paths and the backup paths are assigned for all connections subject to shared risk group constraints. The following are given as inputs:

$p_w^k$ is the working path for connection k. $ij \in p_w^k$ denotes that $p_w^k$ traverses link ij.

$p_b^k$ is the backup path for connection k.

$w_{ij}$ is the number of wavelengths used by working paths on link ij ($w_{ij}$ is derived from $p_w^k$, i.e., $w_{ij} = \sum_{k: ij \in p_w^k} 1$, since working paths are fixed.)

The wavelength assignment equations solve for the following variables:

$F_w^k$ is the value of "1" if the working path for connection k utilizes wavelength w.

$S_w^k$ is the value of "1" if the backup path for connection k utilizes wavelength w.

$m_{ij}^w$ is the value of "1" if wavelength w on link ij is used by some backup path.

$s_{ij}$ denotes the number of wavelengths used by backup paths on link ij.

The following equation states that the objective of wavelength assignment is to minimize the total number of wavelengths-links used by backup paths:

$$\text{Minimize} \sum_{ij} s_{ij} \quad (33)$$

The following two sets of equations ensure that each path is assigned a wavelength:

$$\sum_{w=1}^W F_w^k = 1 \quad \forall k \quad (34)$$

$$\sum_{w=1}^W S_w^k = 1 \quad \forall k \quad (35)$$

The following two sets of equations decide whether a wavelength on a link is used by some backup path:

$$m_{ij}^w \le \sum_{k: ij \in p_b^k} S_w^k \quad \forall ij \in L \quad (36)$$

$$D \times m_{ij}^w \le \sum_{k: ij \in p_b^k} S_w^k \quad \forall ij \in L \quad (37)$$

The following equations states that working paths and backup paths can not share wavelength-links:

$$\left( \sum_{k: ij \in p_b^k} F_w^k \right) + m_{ij}^w \le 1 \quad \forall ij \in L, w \quad (38)$$

The following equations ensure the shared risk group constraints that two backup path can not share any wavelength-link if their corresponding working paths are in the same shared risk group:

$$\sum_{k: ij \in p_w^k \wedge pq \in p_b^k} S_w^k \le 1 \quad \forall w, \forall ij, pq \in L \quad (39)$$

The following equations decide the number of wavelengths used by backup paths on link ij:

$$S_{ij} = \sum_{w=1}^{W} m_{ij}^{w} \quad \forall\, ij \in L \tag{40}$$

The following equation ensures the number of wavelengths used on each link is no more than the total number of wavelengths available:

$$w_{ij}+s_{ij} \leq \forall ij \in L \tag{41}$$

The following equation states that $F^k_w$, $S^k_w$, and $m^w_{ij}$ are binaries and $s_{ij}$ is an integer:

$$F_w^k, S_w^k, m_{ij}^w \in \{0,1\}, s_{ij} \in \text{integer } \forall 1 \leq k \leq d, 1 \leq w \leq W, ij \in L \tag{42}$$

Heuristic

Another embodiment uses a heuristic for determining routing and wavelength assignments for working paths and backup paths. First, the heuristic determines the shortest fiber-disjoint path-pair for each connection subject to area constraints and partition each inter-area connection into a set of sub-paths according to the shared network element its working path and backup path traverse. The heuristic then assigns wavelengths to all the lightpaths of each area. For all the fiber-disjoint path-pairs of an area, the backup paths are rerouted to maximize backup resource sharing with respect to SRG constraints, and the working paths are rearranged to reduce the number of wavelengths-links that working paths use.

The inputs to the heuristic are:

G is a weighted, directed graph that represents the network topology;

W is the number of wavelengths on each link;

P is a proper partitioning configuration; and

D is a set of connection requests.

First, the heuristic computes the shortest fiber-disjoint paths for each connection subject to area constraints such that the working path and the backup path of an inter-area connection enter or exit an area through a common, shared network element, and the intra-area connection cannot use resource of other areas. In this embodiment, Suurballe's algorithm is used to compute the shortest fiber-disjoint path pair for a connection whose source and destination network elements are in the same area. This first part works on a per-connection basis.

For any connection $k \in D$, if k is an intra-area connection, the Suurballe's algorithm is used. If k is an inter-area connection, it constructs a directed, weighted auxiliary graph $G^k_a$ such that, when transformed back to G, the shortest path between $(k_s, k_d)$ in $G^k_a$ is the shortest fiber-disjoint path-pair for $(k_s, k_d)$ in G. $G^k_a$ has $k_s$, $k_d$, and the shared network elements as its vertices.

1. A weighted, directed graph $G_a=(V_a, E_a)$ is constructed as follows:

1.1 $V_a=R$, the set of shared network elements 1.2 $\forall i \neq j \in V_a, ij \in E_a$, if and only if $\exists A \in P \text{ s.t. } ij \in A$ 1.3 $C_{ij}$, the cost of ij, is the cost of the shortest fiber-disjoint path-pair between node-pair (i,j,) among all such path-pairs in any area A such that $i \in A \land j \in A$.

Then it applies the following steps to each inter-area connection k (k is an inter-area connection iff $\forall A \in P, \neg(k_s, k_d \in A)$).

2. Construct a weighted directed graph $G_a^k=(V_a^k, E_a^k)$ as follows (assume $k_s \in A_s, k_d \in A_d, A_s \neq A_d \in P$):

2.1. $V_a \cup \{k_s, k_d\}$ 2.2. $E_a^k$ comprises the following three components.

2.2.1 $\forall r \in R \land r \in A_s, k_s r \in E_a^k$, $C_{sr}$ is the cost of the shortest fiber-disjoint path-pair between $(k_s, r)$ in $A_s$.

2.2.2 $\forall r \in R \land r \in A_s, rk_d \in E_a^k$, $C_{rd}$ is the cost of the shortest fiber-disjoint path-pair between $(r, k_d)$ in $A_s$.

2.2.3. $\forall r_1 \neq r_2 \in R \land \neg(r_1, r_2 \in A_s \lor r_1, r_2 \in A_d), r_1, r_2 \in E_a^k$ and it has the same cost as $r_1 r_2$ in $G_a$.

3. Compute the shortest path between $(k_s, k_d)$ in $G_a^k$. Let it be $\langle r_0=k_s, r_1, \ldots, r_k r_{k+1}=k_d \rangle$.

4. Concatenate the shortest fiber-disjoint path-pair between $r_i$ and $r_{i+1}$ in G, for i-0,1, . . . , k, to obtain the shortest fiber-disjoint path-pair for connection k in G.

The heuristic then assigns wavelengths. The wavelength-assignment of working paths and backup paths are transformed to the graph coloring problem and employs a sequential coloring algorithm. First, an undirected graph $G_C$ in which each path is treated as a vertex. Two working paths are adjacent in GC if they traverse a common fiber. A working path and a backup path are adjacent if they traverse a common fiber. Two backup paths are adjacent if their corresponding working paths are in the same SRG such that the two working path traverse a common fiber. All the vertices are colored such that adjacent vertices have different colors. The sequential order is smallest-last in which vertex of smallest degree is colored last.

The heuristic then performs an optimization procedure to rearrange the working path and backup path to reduce the total number of wavelengths-links used. First, the backup lightpaths are rerouted to maximize backup sharing. Second, the working paths are rearranged since there may be a shorter path available after rerouting the backup paths.

In the first step, one connection, k, is randomly picked with a working path $p^k_w$ and a backup paths $p^k_b$. The backup path is then removed. The cost of wavelength w on link ij, $C^w_{ij}$, is updated as follows:

$$C_{ij}^w = \begin{cases} +\infty & \text{if } p_w^k \text{ traverses link } ij, \text{ or } w \text{ on } ij \text{ is used by some working path, or } w \text{ on } ij \text{ is used} \\ & \text{by some backup path whose working path is on the same } SRG \text{ as } p_w^k \\ C_{ij} & \text{if } w \text{ on link } ij \text{ is not used} \\ 0 & \text{otherwise} \end{cases}$$

The minimal cost path from $k_s$ to $k_d$ at each wavelength layer and the path with the minimal cost as the backup path is picked. The fiber-disjoint and SRG constraints are ensured by the cost function, and the newly computed backup has cost no larger than $p^k_b$. This process is repeated for a predefined number of times or until it converges such as when the new backup path does not have smaller cost compared to the old one for a predefined number of times. Instead of simply admitting the newly computed path with minimum cost, a simple annealing based approach is used.

The second step is similar to the first step, except that the working path is removed and the cost of the wavelength w on link ij is updated according to the following cost function:

$$C_{ij}^w = \begin{cases} +\infty & \text{if } p_b^k \text{ traverses link } ij, \text{ or } p_b^k \text{ shares wavelength with some backup path whose working path} \\ & \text{traverses link } ij, \text{ or } w \text{ on } ij \text{ is used by some path} \\ C_{ij} & \text{otherwise} \end{cases}$$

Data and Analysis

Figure 5:
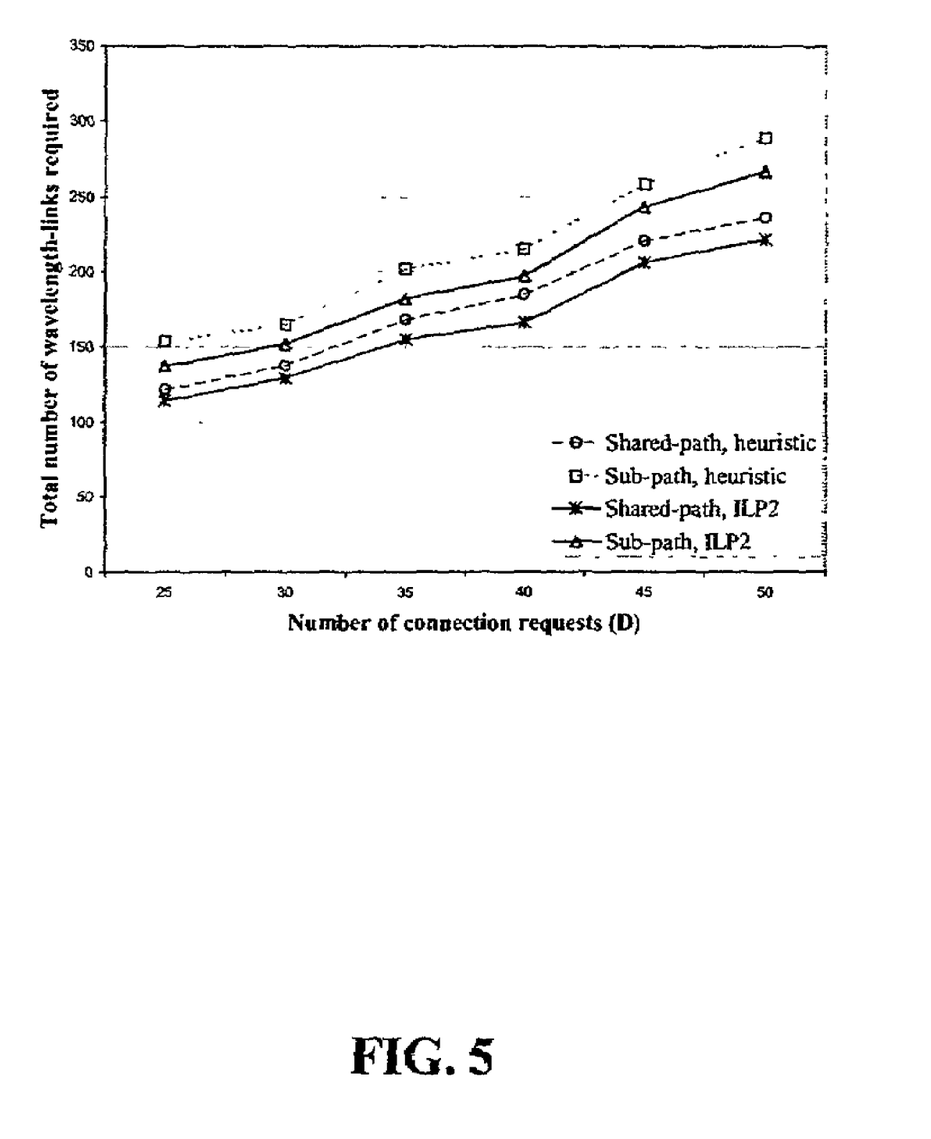
FIG. 5 is a graph of number connection requests vs. total number of wavelength-links required in an example of the invention.

FIG. 5 depicts a graph of number connection requests vs. total number of wavelength-links required in an example of the invention. FIG. 5 shows that sub-path protection requires more resources than shared-path protection.

Figure 6A:
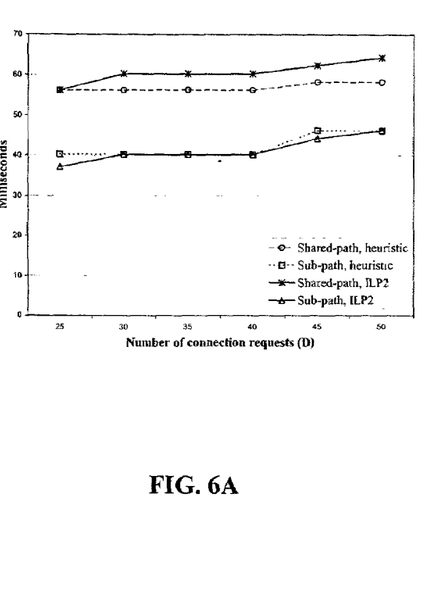
FIG. 6a is a graph of number of connection requests vs. milliseconds for worst-link recovery time in an example of the invention.
Figure 6B:
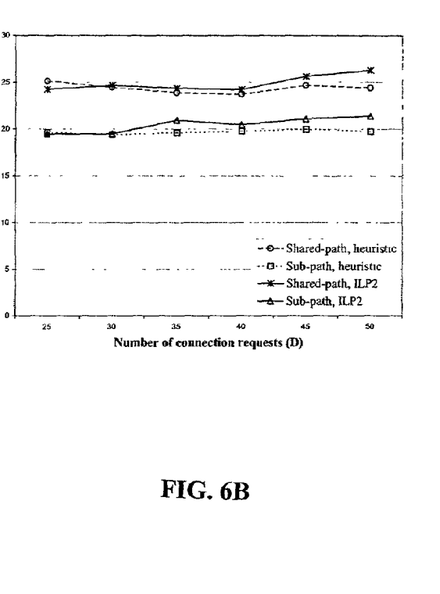
FIG. 6b is a graph of number of connection requests vs. milliseconds for network-wide average recovery time in an example of the invention.

FIG. 6a depicts a graph of number of connection requests vs. milliseconds for worst-link recovery time in an example of the invention. FIG. 6b depicts a graph of number of connection requests vs. milliseconds for network-wide average recovery time in an example of the invention. FIGS. 6a and 6b show that sub-path protection reduces the work-link recovery time and the network-wide recovery time significantly.

The invention advantageously provides scalability from the network control and management point of view. For network control, a non-shared network element only needs to maintain state information or routing tables about the area it belongs to. A shared network element needs to maintain state information or routing tables about the areas it belongs to and the summarized connectivity information between the shared network elements. Also for network control, local signaling information is advantageously filtered at shared network elements and is not disseminated to other areas. In one example, sub-path protection limits fault propagation in the scope of an area compared to the whole network in shared-path protection. Protection switching is the process that both the source network element and the destination network element of an affected connections to switch to the backup path. After the fault occurs, the protection switching happens in the scope of an area, which reduces protection switching time and save control bandwidth as well.

In network management, facility management systems (FMS) monitor network state, localize faults, and provides billing and other capabilities. In some embodiments, each area has its own FMS, and the function of managing the whole network is distributed to each area. Furthermore, fault localization is limited to the scope of an area.

Figure 7:
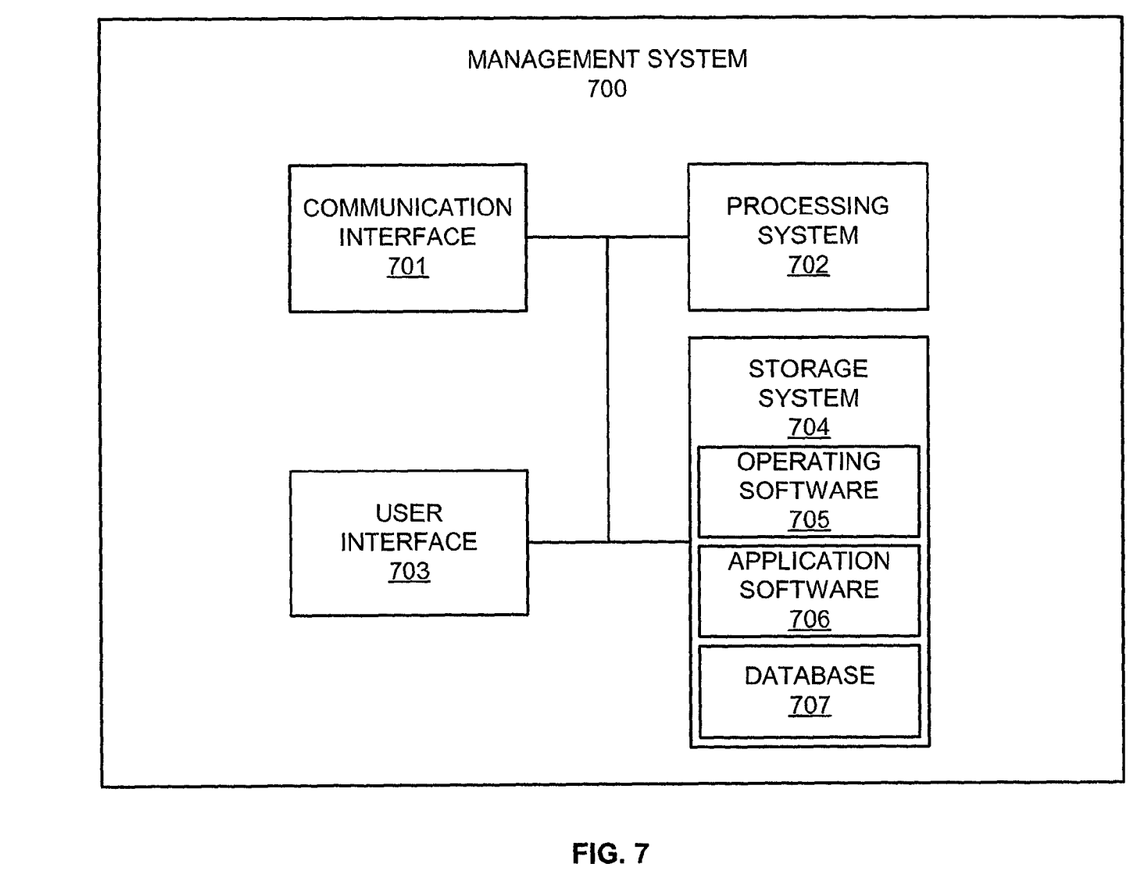
FIG. 7 is a block diagram of a management system in an example of the invention.

Management System—FIG. 7

In some embodiments, a management system performs the above-described functions such as routing and wavelength assignment to operate in accord with the invention. FIG. 7 depicts a block diagram of a management system 700 in an example of the invention. Management system 700 includes communication interface 701, processing system 702, user interface 703, and storage system 704. Storage system 704 stores operating software 705, application software 706, and database 707. Processing system 702 is linked to communication interface 701, user interface 703, and storage system 704. Management system 700 could be comprised of a programmed general-purpose computer, although those skilled in the art will appreciate that programmable or special purpose circuitry and equipment may be used. Management system 700 may use a client server architecture where operations are distributed among a server system and client devices that together comprise elements 701–706.

Communication interface 701 could comprise a network interface card, modem, port, or some other communication device. Communication interface 701 may be distributed among multiple communication devices. Processing system 702 could comprise a computer microprocessor, logic circuit, or some other processing device. Processing system 702 may be distributed among multiple processing devices. User interface 703 could comprise a keyboard, mouse, voice recognition interface, microphone and speakers, graphical display, touch screen, or some other type of user device. Storage system 704 could comprise a disk, tape, integrated circuit, server, or some other memory device. Storage system 704 may be distributed among multiple memory devices.

Processing system 702 retrieves and executes operating software 705 and application software 706 from storage system 704. Operating software 705 may comprise an operating system, utilities, drivers, networking software, and other software typically loaded onto a general-purpose computer. Application software 706 could comprise an application program, firmware, or some other form of machine-readable processing instructions. When executed by processing system 702, application software 706 directs processing system 702 to operate in accord with the invention as described above. Database 707 stores information related to the network elements such as links, partitions, and connections.

The invention claimed is:

1. A method of establishing connections between source network elements and destination network elements in a communication network comprising a plurality of first network elements, the method comprising:

partitioning the first network elements into at least two areas wherein a shared network element is shared between the at least two areas;

assigning values to links between the first network elements;

for each of the connections:

generating a working path between one of the source network elements and one of the destination network elements through the shared network element;

generating a first backup sub-path within a first one of the at least two areas between the one of the source network elements and the shared network element; and generating a second backup sub-path within a second one of the at least two areas between the shared network element and the one of the destination network elements;
wherein generating the working paths, the first backup sub-paths, and the second backup sub-paths comprises employing at least one of an integer linear program and a heuristic operating on the values to determine the working paths, the first backup sub-paths, and the second backup sub-paths.

2. The method of claim 1 wherein the communication network comprises a mesh configuration wherein each of the first network elements is connected to at least two other first network elements.

3. The method of claim 1 wherein partitioning the first network elements into the at least two areas uses border gateway protocols (BGP).

4. The method of claim 1 wherein partitioning the first network elements into the at least two areas is by administrative domain.

5. The method of claim 1 further comprising receiving connection requests to establish the connections between the source network elements and the destination network elements.

6. The method of claim 1 further comprising:
detecting a failure of a link or one of the first network elements in one of the at least two areas; and
switching communication traffic on a portion of one of the working paths to a respective backup sub-path in the one of the at least two areas where the failure was detected.

7. The method of claim 1 further comprising ensuring, for each of the connections, that the working path, the first backup sub-path, and the second backup sub-path do not share links between the first network elements.

8. The method of claim 1 wherein generating the first backup sub-path of each of the connections only uses the first network elements within the first one of the at least two areas.

9. The method of claim 1 wherein generating the second backup sub-path of each of the connections only uses the first network elements within the second one of the at least two areas.

10. The method of claim 1 further comprising assigning wavelengths to the working path, the first backup sub-path, and the second backup sub-path of each of the connections.

11. The method of claim 1 wherein generating the working path, the first backup sub-path, and the second backup sub-path of each of the connections further comprises determining routings for the working path, the first backup sub-path, and the second backup sub-path of each of the connections.

12. The method of claim 1 wherein the first backup sub-path and the second backup sub-path of each of the connections are shared.

13. The method of claim 1 wherein the first backup sub-path and the second backup sub-path of each of the connections are dedicated.

14. A software product for establishing connections between source network elements and destination network elements in a communication network comprising a plurality of first network elements, the software product comprising:
application software operational when executed by a processor to direct the processor to partition the first network elements into at least two areas wherein a shared network element is shared between the at least two areas; assign values to links between the first network elements; for each of the connections, generate a working path between one of the source network elements and one of the destination network elements through the shared network element, generate a first backup sub-path within a first one of the at least two areas between the one of the source network elements and the shared network element, and generate a second backup sub-path within a second one of the at least two areas between the shared network element and the one of the destination network elements; the application software comprising at least one of an integer linear program and a heuristic configured to operate on the values to generate the working paths, the first backup sub-paths, and the second backup sub-paths when executed by the processor; and
a software storage medium operational to store the application software.

15. The software product of claim 14 wherein the communication network comprises a mesh configuration wherein each of the first network elements is connected to at least two other first network elements.

16. The software product of claim 14 wherein the application software is operational when executed by the processor to direct the processor to partition the first network elements into the at least two areas by using border gateway protocols (BGP).

17. The software product of claim 14 wherein the application software is operational when executed by the processor to direct the processor to partition the first network elements into the at least two areas is by administrative domain.

18. The software product of claim 14 wherein the application software is operational when executed by the processor to direct the processor to receive connection requests to establish the connections between the source network elements and the destination network elements.

19. The software product of claim 14 wherein the application software is operational when executed by the processor to direct the processor to detect a failure of a link or one of the first network elements in one of the at least two areas and switch communication traffic on a portion of one of the working paths to a respective backup sub-path in the one of the at least two areas where the failure was detected.

20. The software product of claim 14 wherein the application software is operational when executed by the processor to direct the processor to ensure that, for each of the connections, the working path, the first backup sub-path, and the second backup sub-path do not share links between the first network elements.

21. The software product of claim 14 wherein the application software is operational when executed by the processor to direct the processor to generate the first backup sub-path of each of the connections by only using the first network elements within the first one of the at least two areas.

22. The software product of claim 14 wherein the application software is operational when executed by the processor to direct the processor to generate the second backup sub-path of each of the connections by only using the first network elements within the second one of the at least two areas.

23. The software product of claim 14 wherein the application software is operational when executed by the processor to direct the processor to assign wavelengths to the working path, the first backup sub-path, and the second backup sub-path of each of the connections.

24. The software product of claim 14 wherein the application software is operational when executed by the processor to direct the processor to determine routings for the working path, the first backup sub-path, and the second backup sub-path of each of the connections.

25. The software product of claim 14 wherein the first backup sub-path and the second backup sub-path of each of the connections are shared.

26. The software product of claim 14 wherein the first backup sub-path and the second backup sub-path of each of the connections are dedicated.

27. A system for establishing connections between source network elements and destination network elements in a communication network comprising a plurality of first network elements, the system comprising:
- a processing system configured to partition the first network elements into at least two areas wherein a shared network element is shared between the at least two areas; assign values to links between the first network elements; for each of the connections, generate a working path between one of the source network elements and one of the destination network elements through the shared network element, generate a first backup sub-path within a first one of the at least two areas between the one of the source network elements and the shared network element, and generate a second backup sub-path within a second one of the at least two areas between the shared network element and the one of the destination network elements; wherein the processing system is further configured to employ at least one of an integer linear program and a heuristic operating on the values to generate the working paths, the first backup sub-paths, and the second backup sub-paths; and
- an interface connected to the processing system and configured to transmit instructions for generating the working path, the first backup sub-path, and the second backup sub-path for each of the connections to the first network elements.

28. The system of claim 27 wherein the communication network comprises a mesh configuration wherein each of the first network elements is connected to at least two other first network elements.

29. The system of claim 27 wherein the processing system is configured to partition the first network elements into the at least two areas using border gateway protocols (BGP).

30. The system of claim 27 wherein the processing system is configured to partition the first network elements into the at least two areas by administrative domain.

31. The system of claim 27 wherein the processing system is configured to receive connection requests to establish the connections between the source network elements and the destination network elements.

32. The system of claim 27 wherein the processing system is configured to detect a failure of a link or one of the first network elements in one of the at least two areas and switch communication traffic on a portion of one of the working paths to a respective backup sub-path in the one of the at least two areas where the failure was detected.

33. The system of claim 27 wherein the processing system is configured to ensure that, for each of the connections, the working path, the first backup sub-path, and the second backup sub-path do not share links between the first network elements.

34. The system of claim 27 wherein the processing system is configured to generate the first backup sub-path of each of the connections by only using the first network elements within the first one of the at least two areas.

35. The system of claim 27 wherein the processing system is configured to generate the second backup sub-path of each of the connections by only using the first network elements within the second one of the at least two areas.

36. The system of claim 27 wherein the processing system is configured to assign wavelengths to the working path, the first backup sub-path, and the second backup sub-path of each of the connections.

37. The system of claim 27 wherein the processing system is configured to determine routings for the working path, the first backup sub-path, and the second backup sub-path of each of the connections.

38. The system of claim 27 wherein the first backup sub-path and the second backup sub-path of each of the connections are shared.

39. The system of claim 27 wherein the first backup sub-path and the second backup sub-path of each of the connections are dedicated.

* * * * *